United States Patent [19]
Kuchta

[11] Patent Number: 5,602,668
[45] Date of Patent: Feb. 11, 1997

[54] DATA COMMUNICATIONS AND ILLUMINATED LIGHT ON THE SAME OPTICAL FIBER

[75] Inventor: Daniel M. Kuchta, Cortlandt Manor, N.Y.

[73] Assignee: International Business Machines Corporation, Armonk, N.Y.

[21] Appl. No.: 346,644

[22] Filed: Nov. 30, 1994

[51] Int. Cl.[6] .......................... H04B 10/12; H04B 10/00
[52] U.S. Cl. .......................... 359/173; 359/159; 359/172; 340/825.72
[58] Field of Search ................................. 359/129, 133, 359/142, 159, 118, 169–170, 172, 173; 455/151.2; 340/825.72

[56] References Cited

U.S. PATENT DOCUMENTS

| 4,297,000 | 10/1981 | Fries | 350/96.24 |
| 4,824,201 | 4/1989 | Kazovsky | 359/173 |
| 5,265,732 | 11/1993 | Long | 209/580 |

FOREIGN PATENT DOCUMENTS

0566516A1 10/1993 European Pat. Off. .

*Primary Examiner*—Wellington Chin
*Assistant Examiner*—Kinfe-Michael Negash
*Attorney, Agent, or Firm*—Perman & Green

[57] ABSTRACT

An a) infrared data signal and a b) visible light signal including infrared shot noise are provided to opposite sides of a cold bandpass mirror for transmitting the infrared data signal into a light pipe and for reflecting the visible light signal into the light pipe and for transmitting the infrared shot noise through the cold bandpass mirror and away from the light pipe. Further, a first lens is situated between a) a source of the infrared data signal and b) the cold bandpass mirror, for focusing the infrared data signal onto the cold bandpass mirror to prevent its diffusion. And further, a second lens is situated between the cold bandpass mirror and the light pipe for focusing the infrared data signal and visible light into the light pipe. And further, a third lens situated between the a) source of the infrared shot noise and visible light and b) the cold bandpass mirror, for focusing the visible light signal and infrared shot noise onto the cold bandpass mirror. Further, two separate optical data sources (FIG. 4) provide two distinct optical data signals (FIG. 4) through the optical fiber, or light pipe. Further, one or more optical data signals—infrared or otherwise—are received at mobile or immobile IR data I/O ports (FIG. 7,8).

31 Claims, 6 Drawing Sheets

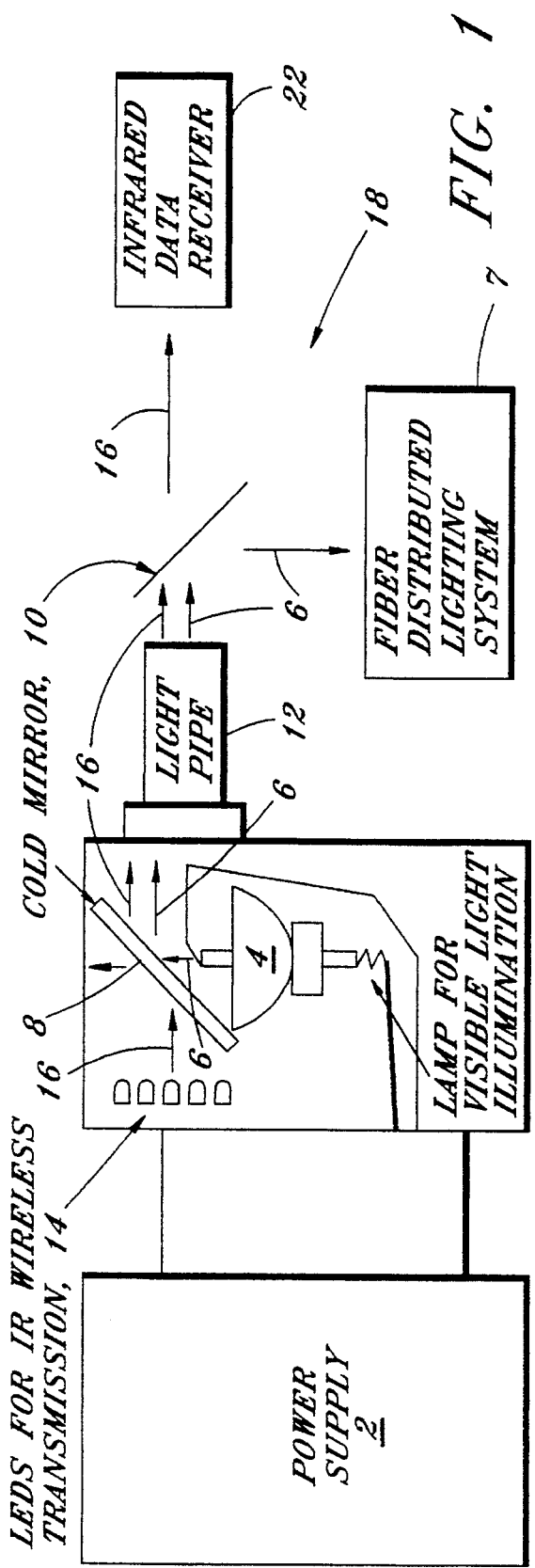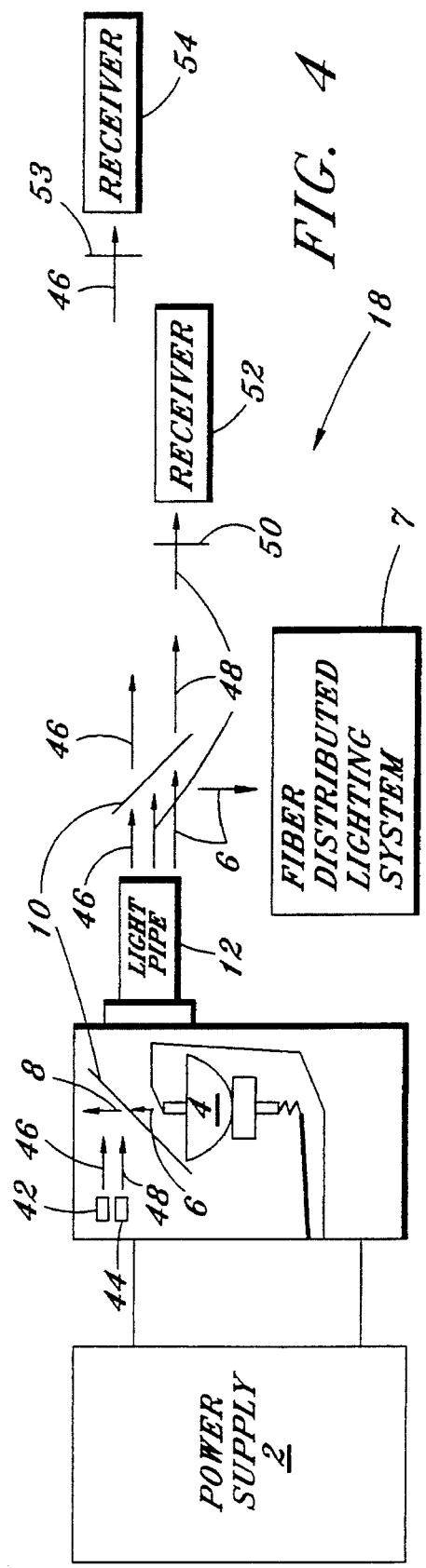

DATA COMMUNICATIONS AND ILLUMINATED LIGHT ON THE SAME OPTICAL FIBER

TECHNICAL FIELD

The present invention relates to fiber distributed lighting systems, fiber optic communications and wireless communications.

BACKGROUND OF THE INVENTION

First, a system is known to provide a lighting system to illuminate a room using an optical fiber. An example of such a system is the GE Light Engine™. Second, a system is known to use optical fiber to provide data. Typically these two are provided through two different optical systems. Is it possible to do both with one system?

It has been proposed to data-modulate a visible light from a lamp used for illumination. This proposal has been difficult to implement because large voltages and currents are required. Further, data rates in the proposed system are inherently limited to rates below several hundred kilobits per second because excited states in the lamps of the proposed system have long life times. In addition, shot noise is a problem associated with data-modulation of illuminating lamps because of the enormous optical power levels involved. In general, light sources that include both visible and infrared spectra create noise problems for data communication equipment that rely on infrared light sources for data transmission.

In fiber distributed lighting systems, it would be desirable to use a light fiber to distribute data as well as light for illumination.

There are two types of wireless communication: radio frequencies (RF) and light (often infrared (IR) but it could be visible light which is far less common). There are many reasons why visible wireless communication is not found in data communication applications. One reason is that the equipment receiving visible light data signals would also be sensitive to non-data signals such as sunlight and light from desk lamps, fluorescent ceiling bulbs, etc. Further, visible light is not used because the sources of visible light, light bulbs or fluorescent tubes for example, cannot have very fast signals superimposed on them or large modulation depths—because of the physics of how they generate light (thermally, in the case of a typical light bulb).

Current IR wireless standards call for data rates from 2,400 bits per second up to 115,200 bits per second and some products are even faster starting at 1,000,000 bits per second. For these two reasons, it is not practical to use the same light source to illuminate a room and send data at the same time.

According to the invention presented and claimed here, a second light source that is capable of being modulated at higher speeds must be combined with a light source that is being used for visible illumination. There are visible light sources such as red light-emitting diodes (LED) that are not used for room illumination that can be modulated up to 1,000,000 bits per second. Again, the reason that you would not want to use these is that the receiving equipment would have a tough time distinguishing what is signal and what is noise.

This brings us to infrared light sources. For IR, the problem with interfering noise is greatly reduced by using filters to remove the visible light noise before it reaches the data receiving equipment. This receiving equipment will still be sensitive to infrared noise that is present in sunlight, tungsten light bulbs and fluorescent lights.

In rooms with existing light fixtures, this infrared noise is a problem that IR wireless equipment has to live with. It is not practical to expect people to put IR filters on every light in their office or home but, with rooms or offices that install fiber-based light systems such as the GE Light Engine™ it is possible and practical to filter out IR noise at the light source before it is distributed for illumination. This means that IR data communications equipment that is used in rooms or offices illuminated by an IR filtered visible light source will not see any noise light sources (except sunlight possibly). This is one advantage to using a fiber based lighting system. The other advantage is that other light sources can be combined with the visible light and get distributed as well. In the invention described and claimed here, an IR data signal gets combined with a visible light source that has its IR filtered out. So, the only things travelling down the light pipes are the visible light and the IR data signal and no IR noise. The bandwidth IR data signal can be whatever the application calls for (up to the limits of the IR source which for LEDs is currently under 50,000,000 bits per second, but for lasers it is much higher). So, the IR data source does not necessarily have to have a bandwidth that is higher than the visible light source is capable of! In practice, though, this will be the case in signals greater than 1,000,000 bits per second.

DISCLOSURE OF THE INVENTION

Objects of the present invention include providing a) an optical fiber carrying visible light and data as two separate signals, b) two separate optical data signal on a single optical fiber, and (c) a fiber distributed lighting illumination system sourced from a single optical fiber having both data communications.

According to the present invention, an a) infrared data signal and a b) visible light signal including infrared shot noise are provided to opposite sides of a cold bandpass mirror for transmitting the infrared data signal into a light pipe and for reflecting the visible light signal into the light pipe and for transmitting the infrared shot noise through the cold bandpass mirror and away from, or at least not into, the light pipe. Further, a first lens is situated between a) the source of the infrared data signal and b) the cold bandpass mirror, for focusing the infrared signal to prevent its diffusion. And further, a second lens is situated between the cold bandpass mirror and the light pipe for focusing the infrared data signal and visible light into the light pipe. And further, a third lens situated between the a) source of the infrared shot noise and visible light and b) the cold bandpass mirror, for focusing the visible light signal and infrared shot noise onto the cold bandpass mirror. Further, two separate optical data sources provide two distinct optical data signals through the optical fiber, or light pipe. Further, one or more optical data signals—infrared or otherwise—are received at mobile or immobile IR data I/O ports.

Potential users of this invention will be those who a) install fiber-based light systems into their homes, offices, train stations, etc., and b) desire data signals as well. Other potential users are producers of diffuse infrared wireless products.

One advantage of the present invention is that is overcomes the difficulties of modulated visible light by providing a separate, easy-to-modulate light source, namely, the infrared light source.

A second advantage of the present invention is that it overcomes the data rate limitation of proposals to provide data and visible light on a single optical fiber. It does this by using a data communications light source with a much higher bandwidth than could be used by modulating visible light.

A third advantage of the present invention is that it overcomes shot noise by optically filtering out the infrared shot noise from the lightband of the infrared data signal.

A fourth advantage, is that office workers may receive both data and visible light from the same source.

Still other objects, features and advantages will become apparent in light of the drawings and accompanying text.

BRIEF DESCRIPTION OF THE DRAWINGS

FIG. 1 is a side view of the optical system of the present invention;

FIG. 4 is a side view of another embodiment of the present invention;

BEST MODE FOR CARRYING OUT THE INVENTION

Figure 2:
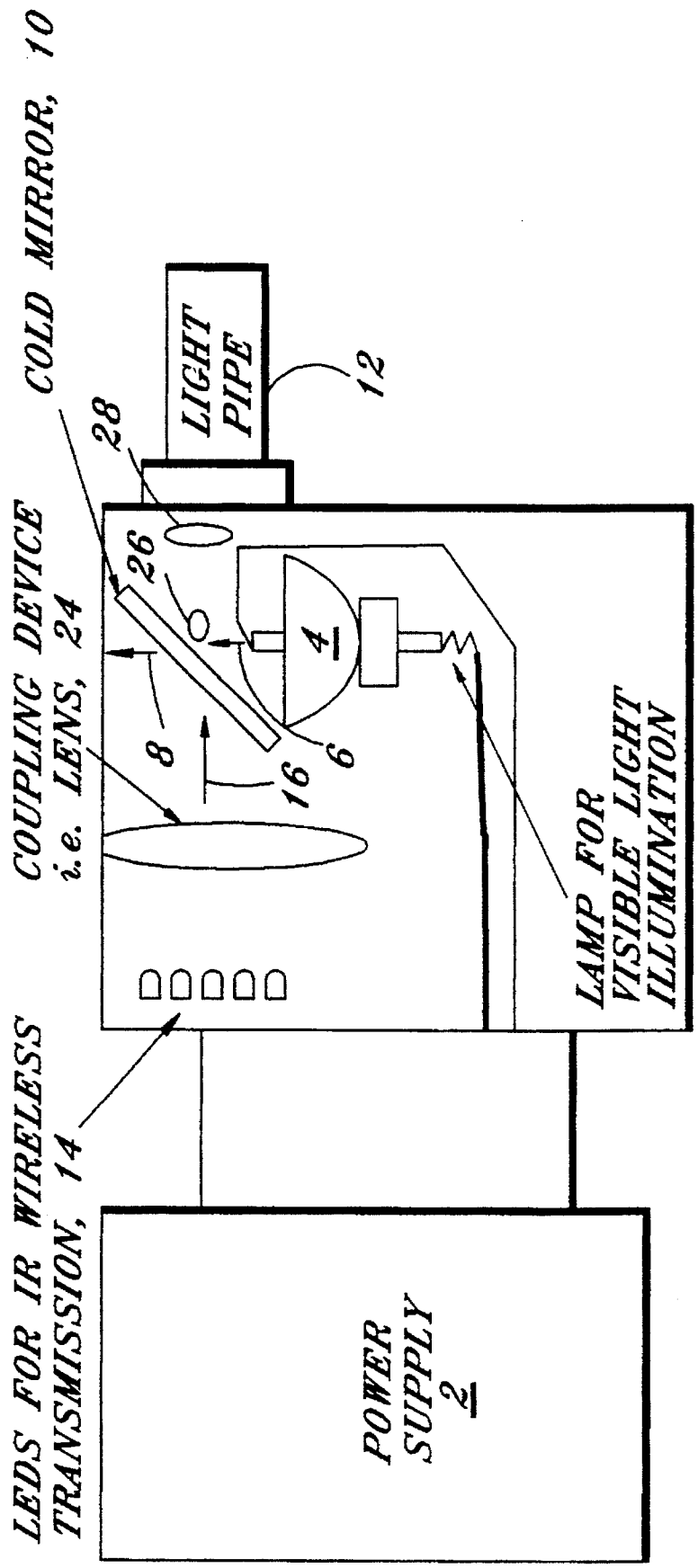
FIG. 2 is a side view of the embodiment shown in FIG. 1, but including lenses.

In FIG. 1, a power supply 2 charges a lamp 4 for providing a visible light signal 6 including infrared shot noise 8 to a cold bandpass mirror 10 which reflects the visible light 6 into a light pipe 12. In addition, a set of LEDs 14 provides an infrared data signal 16 to the cold bandpass mirror 10 which passes the infrared data signal 16 into the light pipe 12. Infrared shot noise 8 from the lamp 4 is not reflected by the cold bandpass mirror 10 into the light pipe 12, but is instead transmitted away from light pipe 12. At the receiver end 18, a cold bandpass mirror 10 reflects the visible light signal 6 into a known fiber distributed lighting system 7 while transmitting the infrared data signal 16 through the cold bandpass mirror 10 into an infrared receiver 22. It will be appreciated by those in the art that any means for separating the infrared data signal from the visible light signal is substitutable for the mirror 10.

FIG. 2 shows an alternative to that of FIG. 1. The difference between FIGS. 1 and 2 is that FIG. 2 has, in addition to the optical system of FIG. 1, first, second and third lenses 24, 26, 28. In addition, the receiver side 18 (FIG. 1) is not shown since it is the same as in FIG. 1. The purpose of each of these lenses 24, 26, 28 is focusing. The first lens 24 focuses the infrared data signal 16 onto the cold bandpass mirror 10. The second lens 26 focuses the visible light signal 6 and infrared shot noise 8 onto the cold bandpass mirror 10. The third lens 28 focuses the infrared data signal 16 and visible light signal 6, coming from the cold bandpass mirror 10, into the light pipe 12.

The lamp 4 is not limited to any source of visible light 6. One option is the GE Light Engine™, which may be bought from GE Lighting #5348, Nela Park, Cleveland, Ohio 44112.

Figure 3:
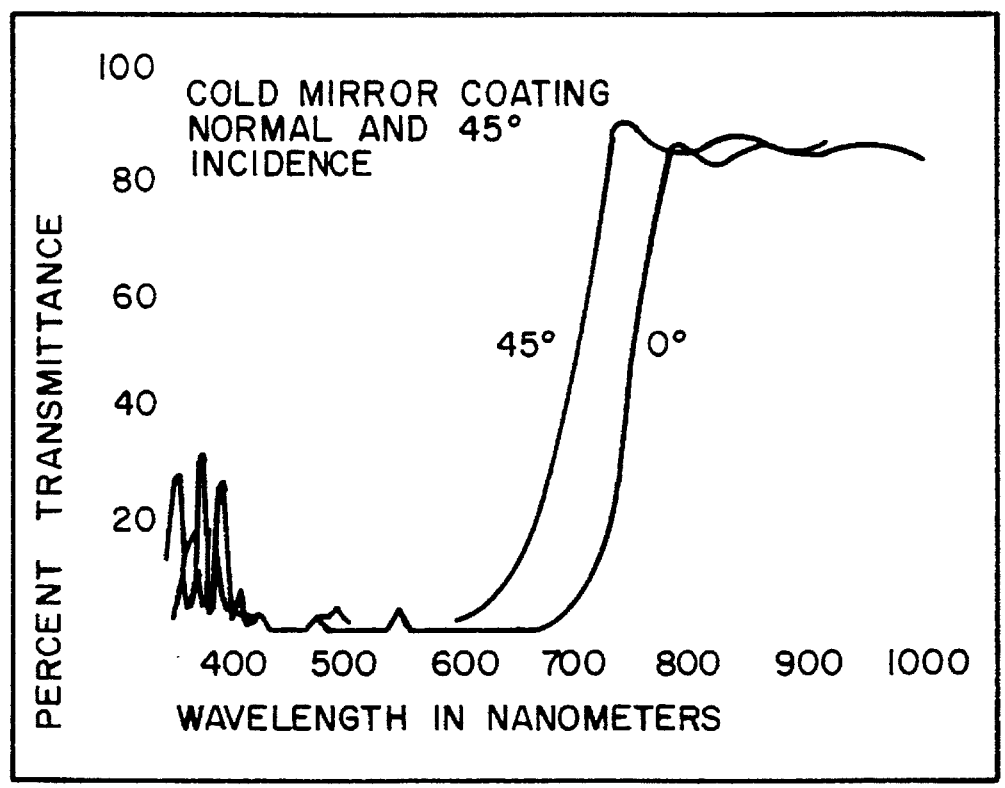
FIG. 3 is a graph of transmittance vs. wavelength for the cold bandpass mirror.

Cold bandpass mirrors 10 are well known. The only requirement for this mirror 10 is that light 16 in the infrared range is transmitted through the cold bandpass mirror 10 and visible light 6 is reflected by the cold bandpass mirror 10 This relationship is shown in FIG. 3 where the percent transmittance is low for light in the visible light range, but high for light in the infrared range. The 45° curve is a especially relevant to the present invention since the cold mirror 10 of FIGS. 1 and 2 is rotated at a 45° angle to the infrared data signal 16 from the LEDs 14. The angle of the mirror 10 is also 45° rotated to the direction of the visible light signal 6 and infrared shot noise 8.

Figure 5:
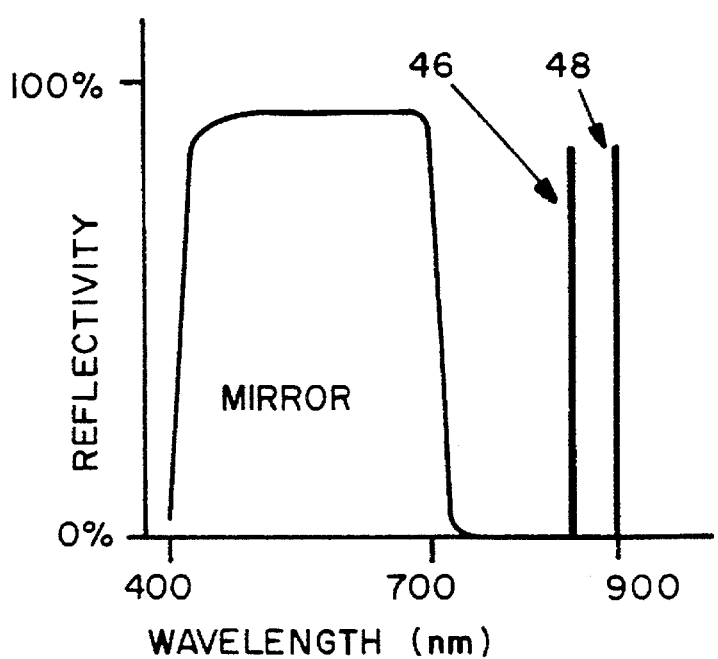
FIG. 5 is a graph of reflectivity versus wavelength for the apparatus of FIG. 1.

FIG. 4 is still another embodiment of the invention in FIG. 1. The difference between FIG. 1 and FIG. 4 is that in FIG. 1 one of the optical signal sources is a data source, LEDs 14, and the other was a visible light source 4 whereas in FIG. 4 two optical data sources 42, 44 provide two optical data signals 46, 48 into the light pipe 12. They do so, however, at two different wavelengths, as shown in FIG. 5. The optical data signals 46, 48 can be infrared.

FIG. 5 is a graph of reflectivity versus wavelength at cold bandpass mirror 10. Visible light 6 is reflected but optical data signals 46, 48 from data sources 42, 44 are transmitted through the mirror 10.

The three signals —data signals 46, 48 and visible light 6—can be received at three different locations. The visible light signal 6 is provided to the fiber distributed lighting system 7. The two data signals 46, 48 are separated out by a first optical filter 50 behind which is a first receiver 52 for receiving the optical data signal 48. The remaining optical data signal 46 passes through a second optical filter 53 for entering a second detector 54 for receiving the data signal 48.

Figure 6:
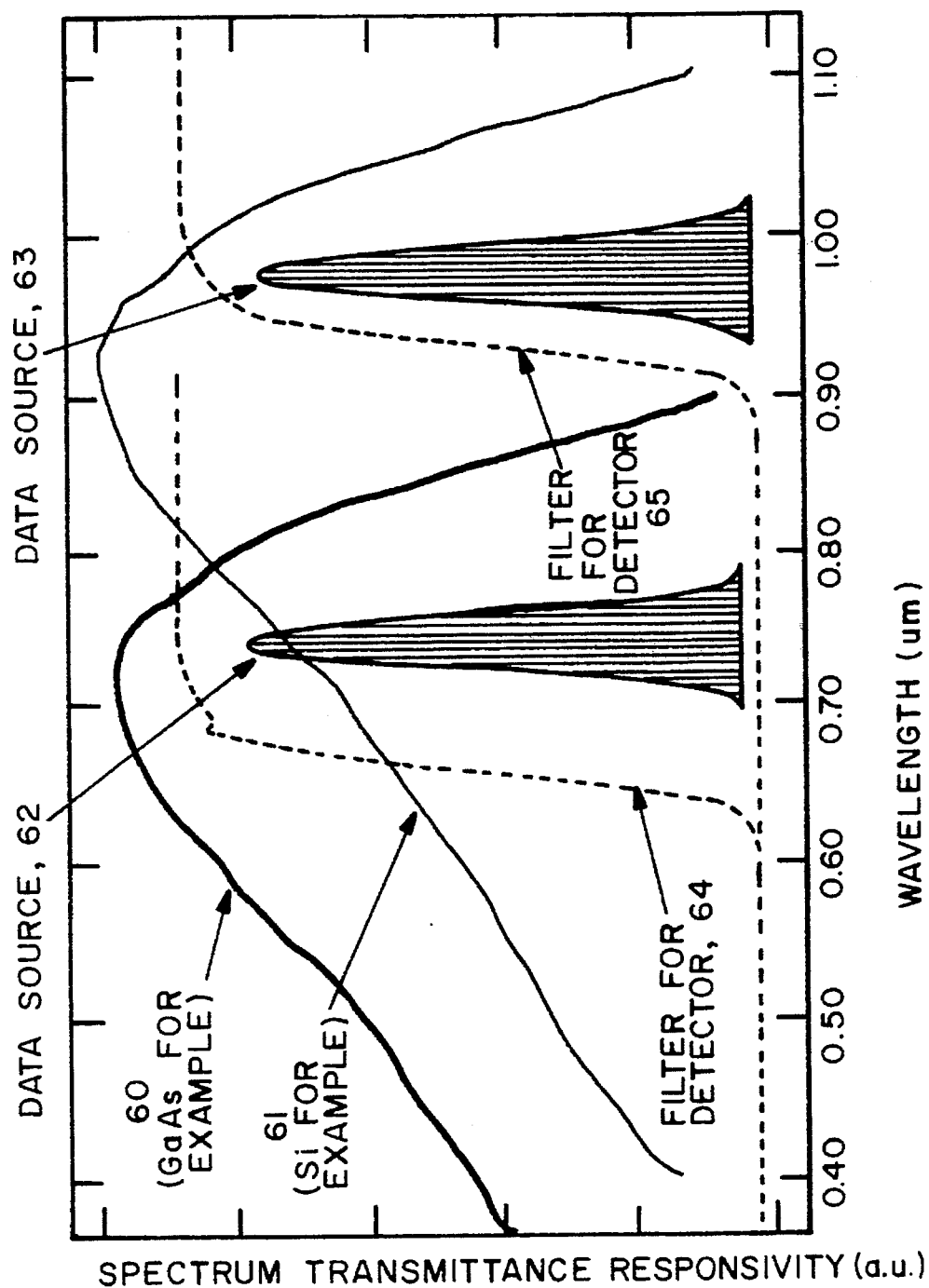
FIG. 6 is a graph of responsivity, transmittance and spectrum versus wavelength.

FIG. 6 shows six waveforms as a function of wavelength. Two waveforms 60, 61 are for the responsivity functions of gallium arsenide and silicon detectors(not shown in FIG. 4,7,8) for receiving in the receivers 52, 54 which detect the data signals 46, 48. A second pair of waveforms 62, 63 are transmittance waveforms for the optical data sources 42, 44 associated with the first and second data signals 46, 48. Finally, there are two potential signal spectrum waveforms 64, 65 for the filters 50, 53.

Figure 7:
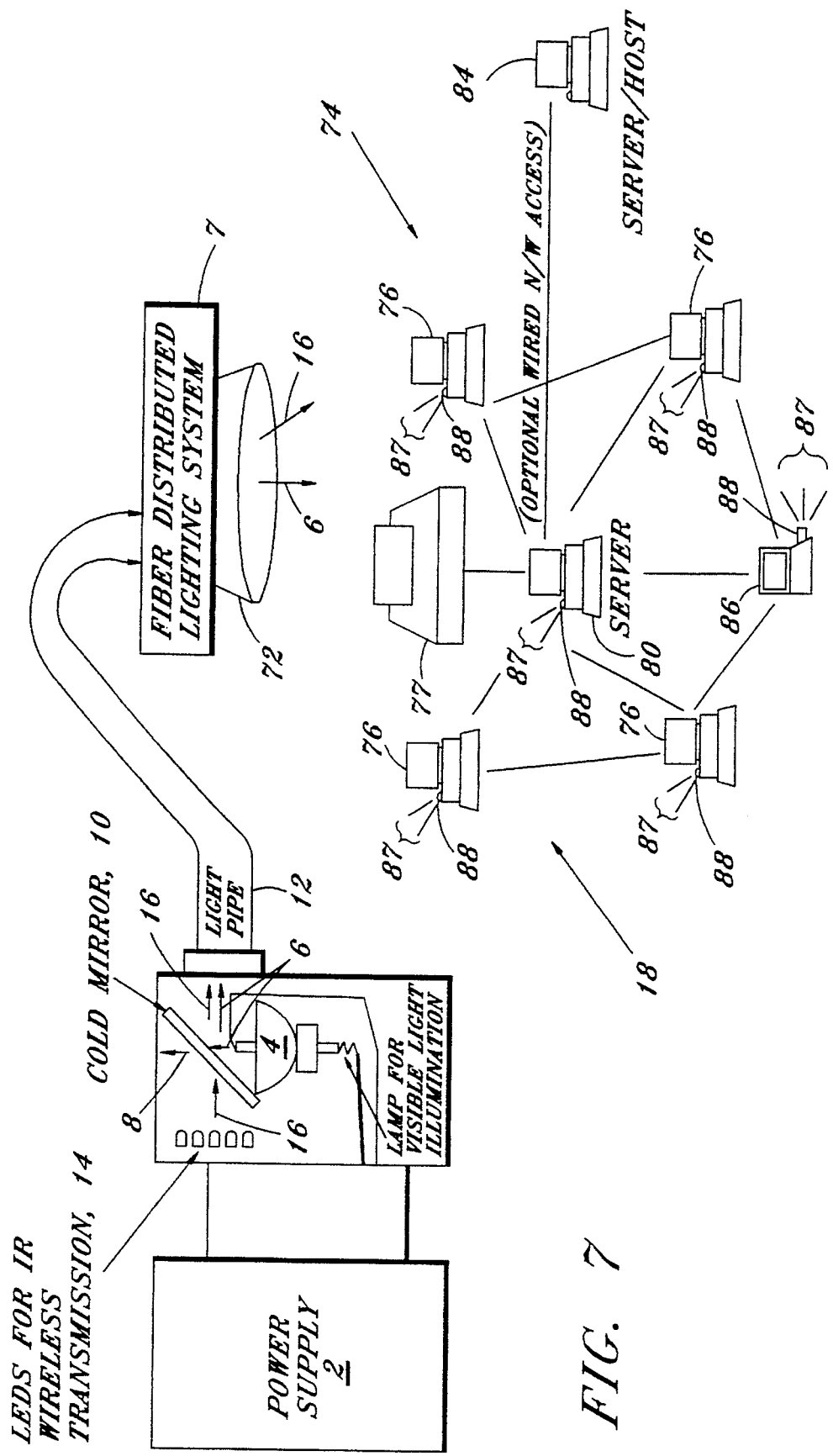
FIG. 7 is side view of the optical system of the present invention.
Figure 8:
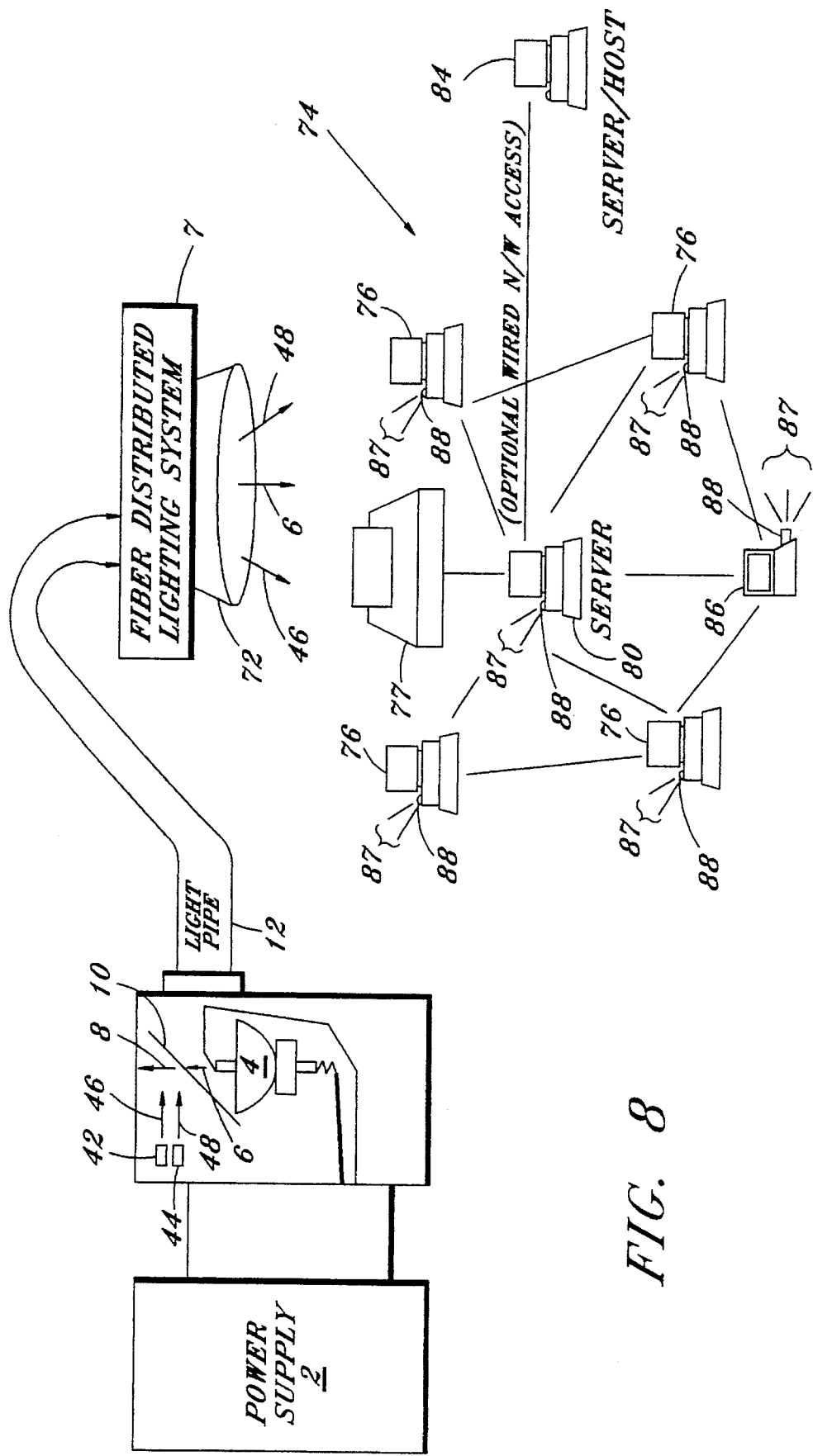
FIG. 8 is a side view of the optical system of the present invention.

FIGS. 7, 8 show embodiments which are alternative to the embodiments in FIGS. 1, 4. The difference between FIGS. 1, 4 and FIGS. 7, 8 is that no cold bandpass mirror 10 is used on the receiving side 18 and the infrared data signal 16 and visible light signal 6 are not immediately separated from one another at the receiver end of the light pipe 12. It will be apparent that the lenses 24, 26, 28 of FIG. 2 could be used.

Instead, a light diffuser 72 is provided from the fiber distributed lighting system 7 to diffuse both the infrared data signal 16 and the visible light signal 6 throughout a room 74 which includes a number of workstations 76, a piece of office equipment 77 (for example, but not limited to a printer, fax machine, personal digital assistant, calculator, copier, telephone, tape recorder) including a server 80 which is wired 82 to a server host 84. Included also in the room 74 is a laptop computer 86 which may be a notebook computer or any other item which includes some type of fixed or mobile data I/O port 88 for receiving the IR data signal 16. As surely as each work station 76, piece of office equipment 77 and laptop 86 can receive the infrared data signal 16, they can communicate their own infrared signals 87. Most of the pieces 76, 77, 86 of office equipment in the room 74 includes the infrared I/O port for receiving the infrared data signal 16. The exception is the server host 84 which needs no IR data I/O port 88 since it is wire connected 82 to the server 80 which receives all IR signals 87 communicated from the work stations 76, laptop 86, piece of office equipment 77.

The design of the IR data I/O port 88 can take any one of number of very well known forms. For starters, each data I/O port includes a plastic visible light absorber(not shown); this is merely the piece of dark plastic which we all see on our televisions and VCRs and which we all know houses an IR data receiver not much different from the IR data receiver 22 of FIG. 1 or the receivers 52, 54 of FIG. 4. In addition the IR data I/O port 88 includes, as mentioned before an IR transmitter (not shown) which is analogous to the type used for television and VCR remote controls.

FIG. 8 is similar to FIG. 7 except that rather than single infrared data signal 16, two data signals 46, 48 are used. The IR data I/O port 87 is operative to handle 1, 2 . . . N optical data signal of the infrared type or some other optical wavelength.

Various modifications to the present invention may be made without departing from the spirit and scope of the present invention. At a minimum, the selection of the a) infrared data communications signal source, b) visible light source, c) light pipe and d) cold mirror are all available for the selection of a particular designer interested in implementing the present invention. Still further, cold bandpass mirrors which do not require a 45° angle, but rather some other angle, may be used without departing from the spirit and scope of the present invention. Still further, but not finally as those skilled in the art could understand, the selection of the two sources is also a modifiable decision of the designer which is not outside the scope of the present invention. For example, a data source other than infrared might be chosen and the visible light source need not be within any particular range of the visible spectra.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for providing both visible light and a data signal through a single light pipe, comprising:

a) an infrared source for providing an infrared data signal along a first line;

b) a visible light source including infrared shot noise for providing a visible light signal along a second line;

c) a cold bandpass mirror for transmitting infrared light including said infrared data signal and infrared shot noise and for reflecting said visible light signal; and d) a light pipe for receiving said infrared data signal and visible light signal, but not said infrared shot noise, wherein said infrared data signal and visible light signal enter said light pipe at a first end.

2. The apparatus of claim 1, further including another cold bandpass mirror situated at a second end of said light pipe which is remote from said first end, for filtering out said visible light signal and providing it to a fiber distributed lighting system, said cold bandpass mirror providing said infrared data signal to an infrared data receiver.

3. The apparatus of claim 1, further including a first lens situated between said infrared source and said cold bandpass mirror for focusing said infrared data signal onto said cold bandpass mirror.

4. The apparatus of claim 1, further including a lens situated between said cold bandpass mirror and said light pipe for focusing said infrared data signal and said visible light into said light pipe.

5. The apparatus of claim 1, further including a lens situated between said visible light source and said cold bandpass mirror, for focusing said visible light signal and infrared shot noise onto said cold bandpass mirror.

6. The apparatus of claim 1, wherein said cold bandpass mirror is situated at a 45° angle to both said infrared signal source and visible light source and wherein said first line and second line are orthogonal.

7. The apparatus of claim 1, further comprising at least one of:

a first lens situated between said infrared source and said cold bandpass mirror for focusing said infrared data signal onto said cold bandpass mirror;

a second lens situated between said cold bandpass mirror and said light pipe for focusing said infrared data signal and said visible light into said light pipe; and a third lens situated between said visible light source and said cold bandpass mirror for focusing said visible light signal and infrared shot noise onto said cold bandpass mirror.

8. An apparatus for providing a first light signal and a second light signal through a single optical fiber, comprising:

a) a first signal source for providing a first optical signal along a first line;

b) a second signal source for providing a second optical signal along a second line orthogonal to said first line;

c) a cold mirror, for transmitting said first optical signal and reflecting said second optical signal; and d) a light pipe for receiving said first signal and said second signal.

9. The apparatus of claim 8 wherein either said first signal and second signal are data signals.

10. The apparatus of claim 8 wherein either of said first or second signals is an infrared data signal.

11. The apparatus of claim 8 wherein said first signal is directed for transmission through said cold bandpass mirror into said light pipe and wherein said second signal is directed towards cold bandpass mirror not into said light pipe, such that said first signal is transmitted directly through said cold bandpass mirror into said light pipe and said second signal is reflected off of said cold bandpass mirror into said light pipe, but so much of said second signal as includes spectral components in the range of said first signal is transmitted through said cold bandpass mirror and away from, or at least not into, said light pipe.

12. The apparatus of claim 8, wherein said second optical signal is a visible light signal, said first optical signal is an infrared data signal and said apparatus includes a third signal which is an optical data signal in a frequency range outside of the second data signal, said first and third signals being both directed at said cold bandpass mirror for passing through it.

13. The apparatus of claim 8, wherein said second optical signal is a visible light signal, said first optical signal is an infrared data signal and said apparatus includes a third signal which is an infrared data signal in a frequency range outside of the second data signal, said first and third signals being both directed at said cold bandpass mirror for passing through it.

14. The apparatus of claim 8 wherein either of said first or second signals is an infrared data signal and wherein said apparatus including an infrared local area network including one or more computers for receiving said first and second optical signals.

15. The apparatus of claim 8 wherein either of said first or second signals is an infrared data signal and wherein said apparatus includes one or more infrared data I/O ports for receiving said first or second optical signals.

16. The apparatus of claim 8 wherein either of said first or second signals is an infrared data signal and wherein said apparatus includes one or more mobile infrared data I/O ports for receiving said first or second optical signals.

17. A method for providing both visible light and a data signal through a single light pipe, comprising:

a) providing an infrared data signal along a first line;
   b) providing a visible light signal along a second line wherein said visible light includes infrared shot noise;
   c) transmitting infrared light including said infrared data signal and infrared shot noise through a cold bandpass mirror and reflecting said visible light signal off said cold bandpass mirror; and
   d) receiving in a light pipe said infrared data signal and visible light signal, but not said infrared shot noise, wherein said infrared data signal and visible light signal enter said light pipe at a first end.

18. The method of claim 17, further including filtering out said visible light signal through another cold bandpass mirror and providing it to a fiber distributed lighting system, said cold bandpass mirror providing said infrared data signal to an infrared data receiver.

19. The method of claim 17, further including focusing said infrared data signal onto said cold bandpass mirror through a lens.

20. The method of claim 17, further including focusing said infrared data signal and said visible light into said light pipe through a lens.

21. The method of claim 17, further including focusing said visible light signal and infrared shot noise onto said cold bandpass mirror through a lens.

22. The method of claim 17, wherein said cold bandpass mirror is situated at a 45° angle to both said infrared signal source and visible light source and wherein said first line and second line are orthogonal.

23. A method for providing a first light signal and a second light signal through a single optical fiber, comprising:

a) providing a first optical signal along a first line;
   b) providing a second optical signal along a second line orthogonal to said first line;
   c) transmitting said first optical signal through a cold bandpass mirror and reflecting said second optical signal off of said cold bandpass mirror; and
   d) receiving said first signal and said second signal in a light pipe.

24. The method of claim 23 wherein either said first signal and second signal are data signals.

25. The method of claim 23 wherein either of said first or second signals is an infrared data signal.

26. The method of claim 23 wherein said first signal is directed for transmission through said cold bandpass mirror into said light pipe and wherein said second signal is directed towards cold bandpass mirror not into said light pipe, such that said first signal is transmitted directly through said cold bandpass mirror into said light pipe and said second signal is reflected off of said cold bandpass mirror into said light pipe, but so much of said second signal as includes spectral components in the range of said first signal is transmitted through said cold bandpass mirror and away from, or at least not into, said light pipe.

27. The method of claim 23, wherein said second optical signal is a visible light signal, said first optical signal is an infrared data signal and said method includes a third signal which is an optical data signal in a frequency range outside of the second data signal, said first and third signals being both directed at said cold bandpass mirror for passing through it.

28. The method of claim 23, wherein said second optical signal is a visible light signal, said first optical signal is an infrared data signal and said method includes a third signal which is an infrared data signal in a frequency range outside of the second data signal, said first and third signals being both directed at said cold bandpass mirror for passing through it.

29. The method of claim 23 wherein either of said first or second signals is an infrared data signal and wherein said method further includes the step of diffusing said first signal and said second signal received in said light pipe to at least one of a workstation, a piece of office equipment, and a computer.

30. The method as set forth in claim 29 wherein the step of diffusing is performed to diffuse said first signal and said second signal to at least one infrared data I/O port of said at least one of a workstation, a piece of office equipment, and a computer.

31. The method as set forth in claim 30 wherein said at least one infrared data I/O port is either fixed or mobile.

* * * * *